United States Patent

Todo

[11] Patent Number: 6,049,514
[45] Date of Patent: Apr. 11, 2000

[54] EQUIPMENT FOR TRANSMITTING DATA AND METHOD OF THE SAME

[75] Inventor: Hirofumi Todo, Tokyo, Japan

[73] Assignee: Sony Corporation, Tokyo, Japan

[21] Appl. No.: 08/923,342

[22] Filed: Sep. 4, 1997

[30] Foreign Application Priority Data

Sep. 9, 1996 [JP] Japan .................................. 8-260350

[51] Int. Cl.[7] .................................................... G11B 5/76
[52] U.S. Cl. ........................ 369/48; 369/59; 369/124.04
[58] Field of Search ................................ 369/47, 48, 59, 369/58, 124.04

[56] References Cited

U.S. PATENT DOCUMENTS

| | | | |
|---|---|---|---|
| 4,567,768 | 2/1986 | Satoh et al. ............................. | 73/606 |
| 5,151,699 | 9/1992 | Moriyama ............................... | 341/58 |
| 5,333,126 | 7/1994 | Fukuda et al. ........................... | 369/59 |
| 5,420,844 | 5/1995 | Kawakubo et al. ...................... | 369/59 |
| 5,448,544 | 9/1995 | Tsuchinaga et al. ..................... | 369/59 |
| 5,848,037 | 4/1996 | Iwasaki et al. .......................... | 369/59 |

FOREIGN PATENT DOCUMENTS

| | | |
|---|---|---|
| 0660325 A1 | 6/1995 | European Pat. Off. . |
| 0718843 A1 | 6/1996 | European Pat. Off. . |
| 6-162668 | 6/1994 | Japan . |

OTHER PUBLICATIONS

H. Shirahama Et Al., "A New Fast Pull–In PLL Using Frequency–Difference–Detector," Transactions Of The Institute Of Electronics, Information And Communication Engineers C–11, Published Oct. 1993, vol. J76C–11, No. 10, pp. 679–687.

Patent Abstracts Of Japan, JP 60–000669, Published Jan. 5, 1985, Hitachi Denshi Ltd.

*Primary Examiner*—Nabil Hindi
*Attorney, Agent, or Firm*—Limbach & Limbach, LLP

[57] ABSTRACT

In equipment for transmitting data and a method for transmitting data according to the invention, main and subordinate modulated data to be used for recording are provided in time division, and a dc level is calculated in advance. The dc level is suppressed on the basis of the calculation result of the dc level, and a modulating data is thereby generated with the dc level suppressed. Thus, the equipment and method according to the invention can be applied to, for example, an optical disc drive and the total construction can be simplified. The circuit blocks for transmission systems can be used in common with different systems.

21 Claims, 7 Drawing Sheets

|  | SIGN OF DSV COUNTER FBA, FBB | |
|---|---|---|
|  | IDENTICAL SIGN | OPPOSITE SIGN |
| POLARITY OF MODULATING DATA D10A, D10B — IDENTICAL POLARITY | INVERSION | NONINVERSION |
| POLARITY OF MODULATING DATA D10A, D10B — OPPOSITE POLARITY | NONINVERSION | INVERSION |

FIG. 7

EQUIPMENT FOR TRANSMITTING DATA AND METHOD OF THE SAME

BACKGROUND OF THE INVENTION

1. Field of the Invention

The present invention relates to equipment for transmitting data and a method for the same, which can be applied, for example, to an optical disc drive. In the equipment and the method according to the invention, when compensating a dc level of modulating data, main and subordinate modulated data to be used for recording are provided in time division and the dc level is calculated in advance. The modulating data is generated on the basis of the calculation result. The total construction can be simplified and the circuit blocks for the transmission system can be commonly used for different systems.

2. Description of the Related Art

In a conventional optical disc drive, a dc level of modulating data is calculated in advance, and on the basis of the calculation, the dc level of the modulating data is compensated. The dc level of the modulating data can be suppressed and a recorded data can reliably be reproduced.

Figure 7:
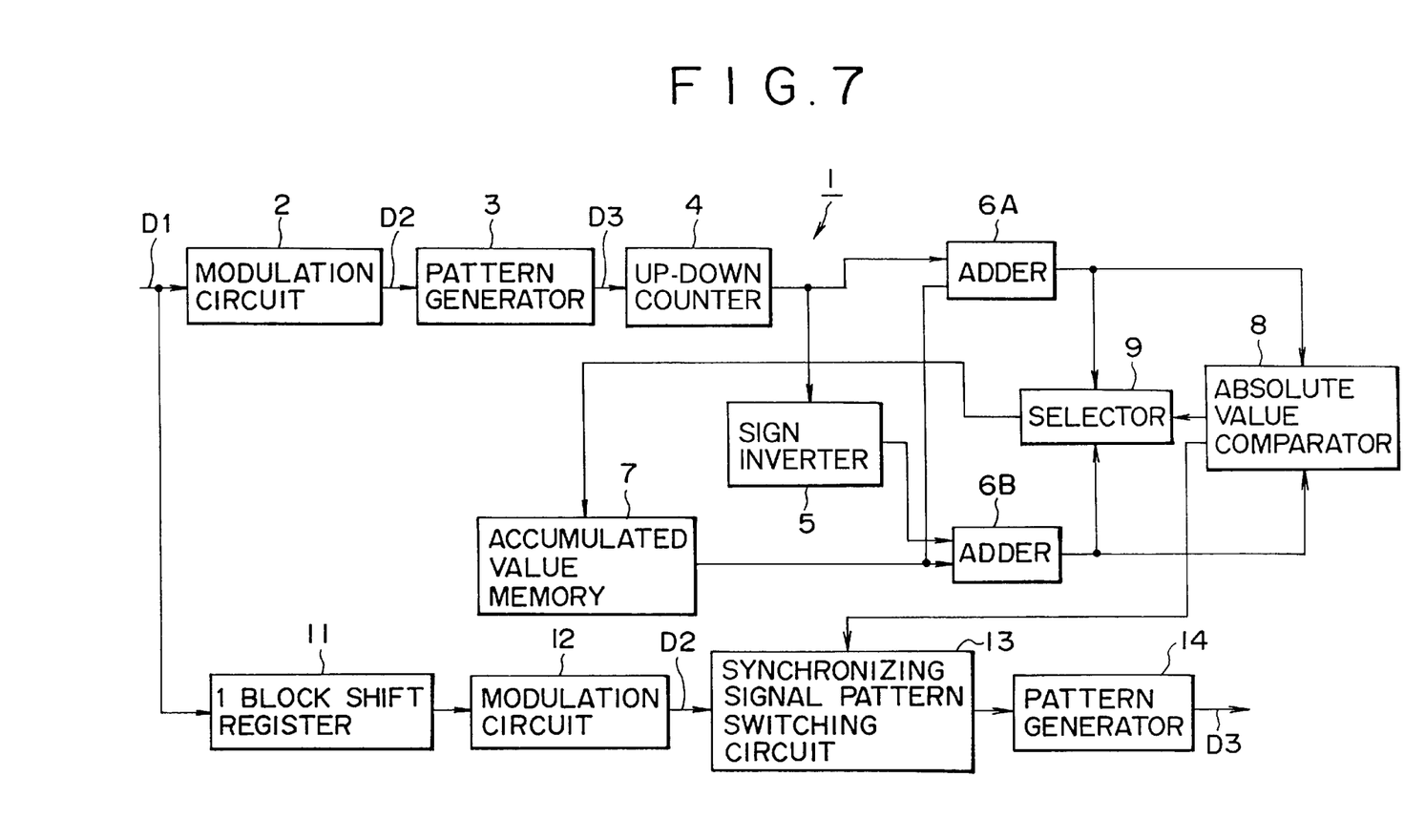
FIG. 7 is a block diagram showing a part of a conventional optical disc drive.

FIG. 7 is a block diagram showing a part of the optical disc drive disclosed in the Japanese Patent Application Laid Open no. 6-162668. In this optical disc drive 1, a modulation circuit 2 modulates data D1 to be used for recording in accordance with modulation system suitable for the recording characteristic of an optical disc and outputs. A pattern generator 3 receives output data D2 from the modulation circuit 2, and when the output data D2 is logic "1", the pattern generator 3 inverts the logical level and then outputs data D3.

An up-down counter 4 receives output data D3 from the pattern generator 3, and when the output data D3 is logic "1", the up-down counter 4 counts up the count value in each one frame of the output data D3, and when the output data D3 is the logic "0", the up-down counter 4 counts down the count value. Thereby, the up-down counter 4 detects the dc level of the output data D3 in each one frame.

A sign inverter 5 receives the count value from the up-down counter 4, inverts the sign of the count value and outputs the inverted sign of the count value. Thereby, the sign inverter 5 detects the dc level of the output data D3 when the sign of the output data D2 is inverted.

An adder 6A outputs the addition of the count value from the up-down counter 4 and an accumulated value stored in an accumulated value memory 7. An adder 6B outputs the addition of the output value from the sign inverter 5 and the accumulated value stored in the accumulated value memory 7. Here, the accumulated value memory 7 is designed to hold an accumulated value of a dc level of continuous modulating data.

An absolute value comparator 8 makes an added value from the adder 6A and an added value from the adder 6B into an absolute value of the former and an absolute value of the latter, respectively, and thereafter outputs the comparison result. A selector 9 selects the added value from the adder 6A or the added value from the adder 6B on the basis of the comparison result, and stores the selected added value in the accumulated value memory 7. Thereby, the selector 9 selects the added value from the adder 6A or the added value from the adder 6B so as to decrease the accumulated value of the dc level.

A one block shift register 11 delays the data D1 to be used for recording for the period of one frame and outputs the data. A modulation circuit 12 modulates the data D1 into the output data D2 in accordance with the same modulation system as the modulation circuit 2. A synchronization pattern switching circuit 13 switches the polarity of the output data D2 from a synchronizing signal added to the output data D2 on the basis of the comparison result of the absolute value comparator 8 and outputs the data. Here, the synchronization pattern switching circuit 13 switches the polarity of the output data D2 so as to correspond with the selecting process by the selector 9.

A pattern generator 14, processing the input data in the same manner as the pattern generator 3, inverts the logic of the output data, when the output data from the synchronizing signal pattern switching circuit 13 is the logic "1". Thereby, in the optical disc drive 1, the dc level of the output data D3 is detected by the up-down counter 4 in advance for one frame to the output data D3 from the pattern generator 14, and on the basis of this detection result, the pattern of the synchronizing signal is switched so as to reduce the dc level.

In the aforementioned construction in FIG. 7, the data D1 to be used for recording is designed to be delayed for the period of one frame by the one block shift register 11. However, the circuit scale of the one block shift register 11 made of delay circuits is apt to become large, and thereby the total construction becomes large to that extent, which is a problem.

Further, since the data D1 to be used for recording is thus delayed and processed by the one block shift register 11, it is difficult to commonly use the recording circuits in a system having a different length for one frame, which is another problem.

SUMMARY OF THE INVENTION

The present invention has been made in view of the foregoing problems, and an object of the present invention is to provide an equipment for transmitting data and a method of the same, whereby the total construction can be simplified and circuit blocks for the transmission system can commonly be used in different systems.

In order to accomplish the foregoing object, the invention is provided with storage means for outputting in time division main modulated data and subordinate modulated data precedent to the main modulated data, and dc level compensation means for compensating a dc level of a main modulating data generated from the main modulated data on the basis of a dc level of modulating data detected from the subordinate modulated data.

Since the storage means output in the time division the main modulated data and the subordinate modulated data, the dc level of the modulating data can be detected in advance from the subordinate modulated data without delay circuits provided, and on the basis of the dc level detected in advance, the dc level of the following main modulated data can be compensated.

DESCRIPTION OF THE PREFERRED EMBODIMENT

Preferred embodiments of the present invention will hereafter be described in detail with reference to the accompanying drawings.

Figure 2:
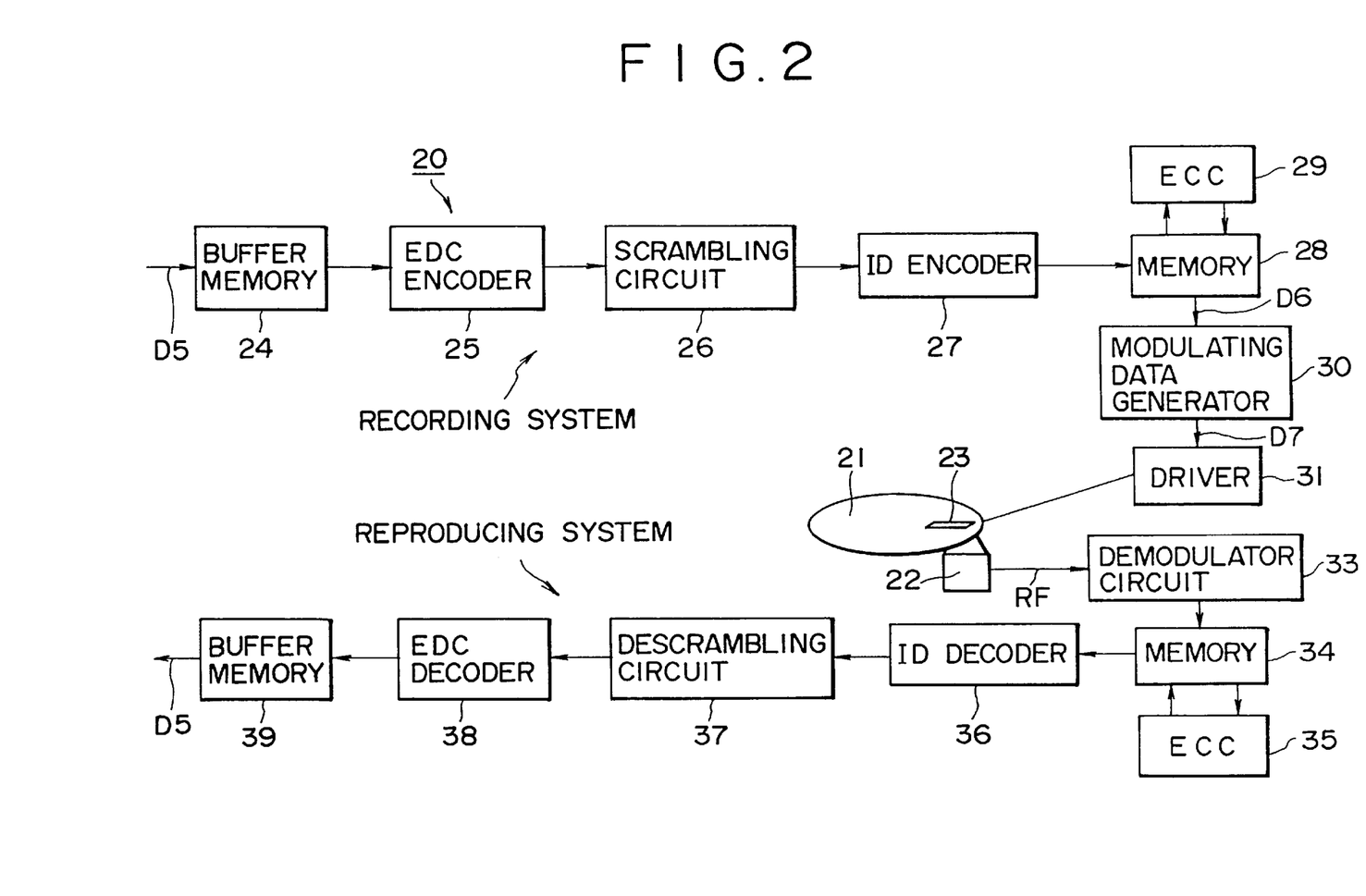
FIG. 2 is a block diagram showing an optical disc drive to which the modulating data generator 30 in FIG. 1 is applied.

FIG. 2 is a block diagram showing an optical disc drive relating to one embodiment of the present invention. This optical disc drive 20, applied to an external storage for a computer or the like, records a user data D5 in a magneto-optic disc 21, and reproduces and outputs the user data D5 recorded in the magneto-optic disc 21.

The magneto-optic disc 21 is provided with the track address and the sector address formatted in advance by a pregroove forming the guide groove for laser beams. When the magneto-optic disc 21 is driven to rotate at a specific rotational speed, an optical pickup 22 emits laser beams and receives a returned light from the magneto-optic disc 21. From the received returned light, a regenerative signal RF is detected, and thereby, the track address and the sector address can be detected. The magneto-optic disc 21 is designed such that, on the basis of the track address and the sector address, a quantity of the laser beams is intermittently raised, a modulation magnetic field is applied by a modulation coil 23, and thereby a desired data can be recorded by the thermomagnetic recording system. Further, while the magnetic Kerr effect is effectively utilized, a change of the plane of polarization of the returned light is detected, and thereby the recorded data can be reproduced.

In the optical disc drive 20, a buffer memory 24 temporarily stores user data D5 and outputs the data in specific blocks. An EDC (Error Detection Code) encoder 25 adds code for error detection on the user data D5 outputted from the buffer memory 24 and outputs the data. A scrambling circuit 26 scrambles an output data from the EDC encoder 25 and outputs the data. An ID encoder 27 adds fixed data such as ID on the output data from the scrambling circuit 26 and outputs the data.

A memory 28 stores output data of the ID encoder 27 by the address control of an address generator not illustrated, and interleaves the data and outputs the interleaved data. An ECC 29 generates codes for error correction on the basis of the data outputted from the memory 28 and stores the generated codes for error correction into the memory 28. Thus, the memory 28 outputs at a specific timing the code for error detection and the codes for error correction, etc., added to the user data D5 as well as the user data D5.

A modulating data generator 30 processes output data D6 (hereinafter, referred to as modulated data) of the memory 28 to output a modulating data D7 suitable for being recorded into the magnet-optical disc 21. A driver 31 drives the modulation coil 23 in accordance with the modulating data D7 so as to correspond with the quantity of the laser beams that rises intermittently. Thereby, the optical disc drive 20, applying the technique of the thermomagnetic recording, records the user data D5 into the magneto-optic disc 21.

In contrast to that, when reproducing the data of the optical disc drive 20, the regenerative signal RF obtained by the optical pickup 22 is inputted to a demodulator circuit 33. Here, the demodulator circuit 33 makes the regenerative signal RF binary on the basis of a specific threshold to generate a binary signal, and generates a regenerative clock. Further, the demodulator circuit 33 sequentially latches the binary signal on the basis of the regenerative clock, and thereby generates reproduced data. Further, the demodulator circuit 33 processes the reproduced data in correspondence with the data processing by the modulating data generator 30, and thereby generates demodulated data from the reproduced data and outputs the data.

A memory 34 holds the demodulated data by the address control of the address generator not illustrated, and outputs the data at a specific timing. An ECC 35 applies error correction processing to the demodulated data outputted from the memory 34 and stores the data into the memory 34.

An ID decoder 36 detects IDs and the like from the demodulated data outputted from the memory 34, and selectively outputs on the basis of the detected IDs. A descrambling circuit 37 descrambles this output data to output. An EDC decoder 38 applies the error detection processing to the output data on the basis of the error detection code added to the output data. A buffer memory 39 holds the output data from the EDC decoder 38, and outputs the data in accordance with the request from an external equipment.

In the optical disc drive 20 for recording and reproducing the user data D5, the modulating data generator 30 is designed to set the logical level of control bits arranged in the modulating data so as to decrease the dc level (corresponding to DSV (Digital Sum Value))of the modulating data D7, and thereby the demodulator circuit 33 can correctly make the regenerative signal RF binary on the basis of the threshold.

Figure 1:
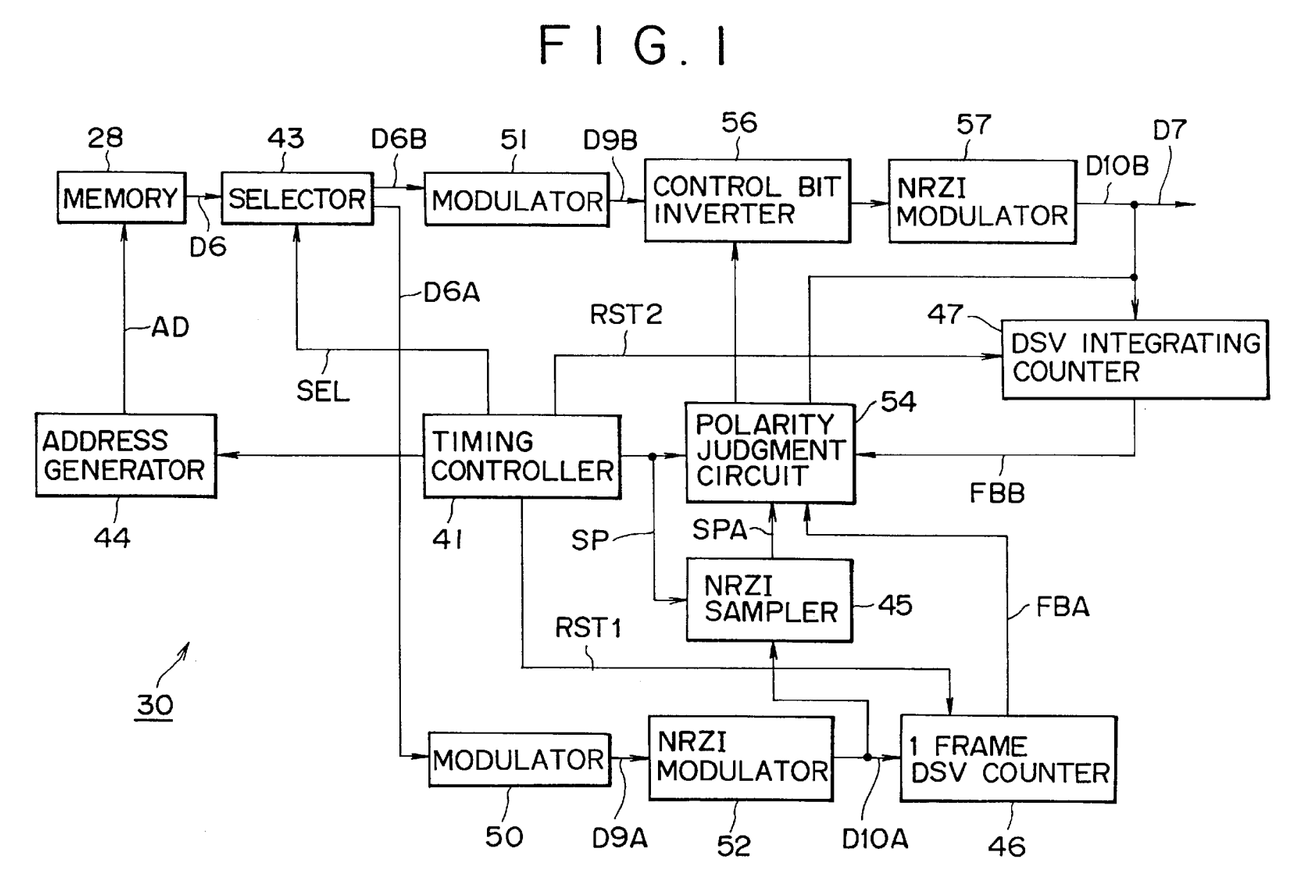
FIG. 1 is a block diagram showing a modulating data generator 30 for an optical disc drive relating to one embodiment of the present invention.

FIG. 1 is a block diagram showing the modulating data generator 30 as well as the peripheral circuits. In the modulating data generator 30, a timing controller 41 outputs a switching signal SEL to a selector 43 on the basis of a clock of the modulated data D6 processed in the modulating data generator 30, and outputs various timing signals necessary for operating an address generator 44. Further, the timing controller 41 outputs a sampling pulse SP to an NRZI sampler 45, and outputs reset pulses RST1 and RST2 that set one frame DSV counter 46 and DSV integrating counter 47, respectively, to the initial values.

Figure 3A:
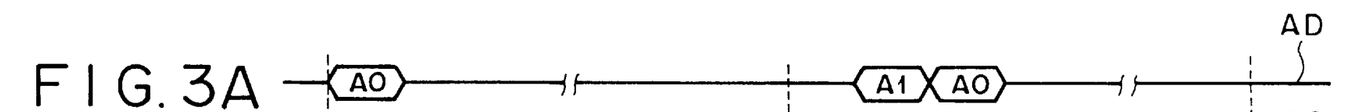
FIGS. 3A to 3D are a waveform chart for explaining the supply of modulated data to the modulating data generator 30 in FIG. 1.
Figure 3B:
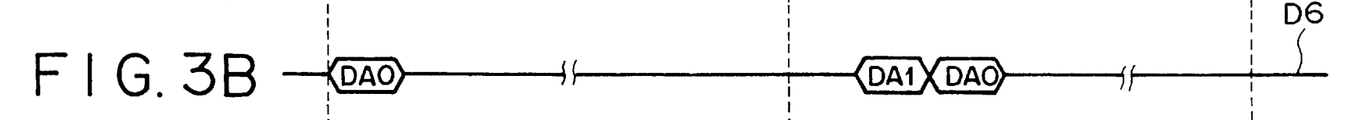

The address generator 44 is controlled by the timing controller 41 to output address data AD to the memory 28. As shown in FIG. 3, the address generator 44 outputs in time division an address data AD (A1) and an address data AD (A0, A1) precedent to the address data AD (A1) for one frame for the modulated data D6 to be recorded into the magneto-optic disc 21 (FIG. 3A). Thereby, the memory 28 is designed to output modulated data DA1 to be recorded into the magneto-optic disc 21 precedently for one frame in each frame, and thereafter to output modulated data DA0 to be recorded into the magneto-optic disc 21 (FIG. 3B).

Figure 3C:
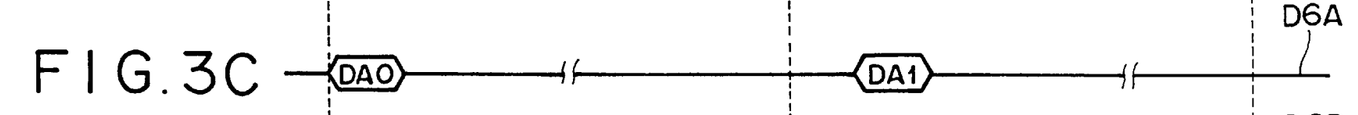
Figure 3D:
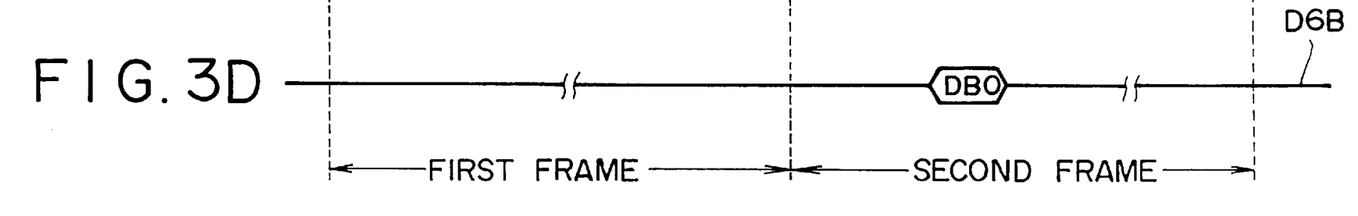

The selector 43 receives the modulated data D6 outputted from the memory 28, controlled by the timing controller 41, outputs a modulated data D6A precedent for one frame to a modulator 50 (FIG. 3C), and outputs a following modulated data D6B to a modulator 51 (FIG. 3D).

Figure 4A:
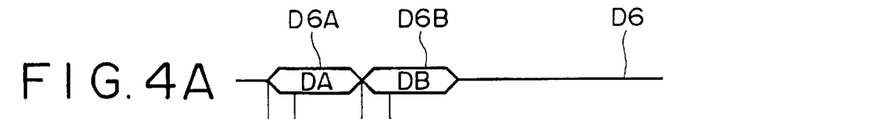
FIGS. 4A to 4M are a waveform chart for explaining the operation of the modulating data generator 30 in FIG. 1.
Figures 4B, 4C, 4D:
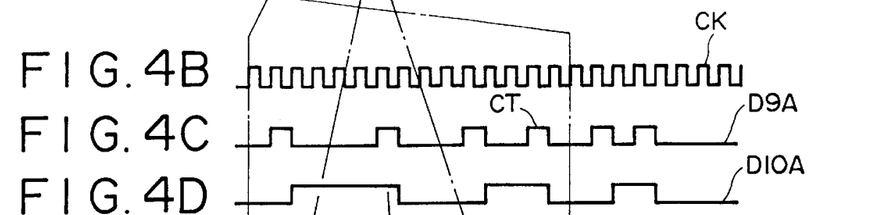

As shown in FIG. 4, the modulator 50 modulates the modulated data D6A (FIG. 4A) in accordance with the 1–7 modulation system, and outputs modulating data D9A (FIG. 4C) formed of the NRZ (Non Return to Zero) code synchronized with a clock CK (FIG. 4B). An NRZI modulator 52 inverts the logical level at the timing that the logical level of the modulating data D9A falls down, and converts the modulating data D9A into a modulating data D10A formed of the NRZI (Non Return to Zero Inverted) code and outputs the data (FIG. 4D).

Figures 4E, 4F:
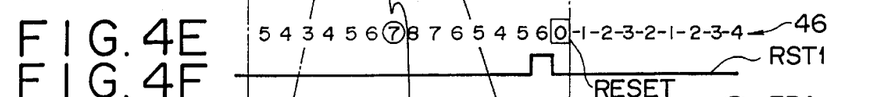

The one frame DSV counter 46 increases or decreases the count value in correspondence with the logical level of the modulating data D10A, and thereby detects a DSV of the modulating data D10A (FIG. 4E). Further, when counting the DSV of the modulating data D10A corresponding to a control bit CT that is allocated to the synchronizing signal of the modulating data D9A, the one frame DSV counter 46 resets the count value by a reset pulse RST1 (FIG. 4F) outputted from the timing controller 41.

Figures 4G, 4H:
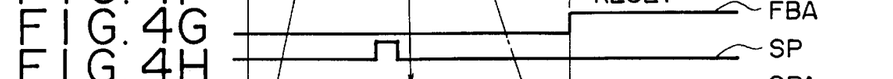

Thereby, the one frame DSV counter 46 detects the DSV of the modulating data D10A precedently for one frame, for the period from the control bit CT of the modulating data D9A through the following control bit CT. Further, the one frame DSV counter 46 generates a sign bit FBA (FIG. 4G) such that the logical level switches in accordance with the sign of the detected DSV, and outputs the sign bit FBA to a polarity judgment circuit 54.

Figure 4I:
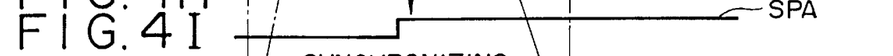

The NRZI sampler 45 samples the modulating data D10A by the sampling pulse SP (FIG. 4H) outputted from the timing controller 41, and outputs a sampled result SPA (FIG. 4I) to the polarity judgment circuit 54.

Thereby, in the modulating data generator 30, the control bit CT is held at a specific value, the modulated data D6 read out precedently for one frame to the memory 28 is processed in the same manner as in recording, the DSV of the modulating data D10A thus obtained is detected in one frame, and on the basis of the sampling pulse SP, the sign of the modulating data D10A is detected.

Figure 4J:
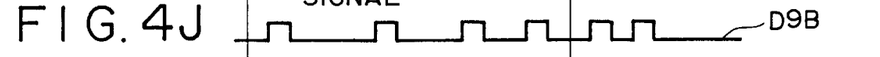

The modulator 51, in the same manner as the modulator 50, modulates the modulated data D6B and outputs the modulating data D9B (FIG. 4J). A control bit inverter 56 receives the modulating data D9B, and being controlled by the polarity judgment circuit 54, inverts the polarity of the control bit CT to output. Here, the control bit inverter 56 sets the polarity of the control bit CT in compliance with the control signal outputted from the polarity judgment circuit 54.

Figure 4K:
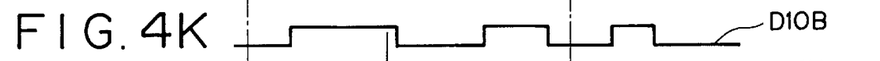

An NRZI modulator 57 receives the output data from the control bit inverter 56, and processes in the same manner as the NRZI modulator 52 to output the modulating data D7 (DLOB) (FIG. 4K).

Figure 4L:
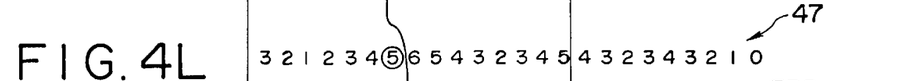
Figure 4M:
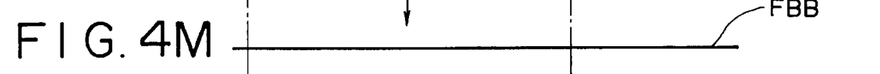

The DSV integrating counter 47, after the count value is reset at the timing of start of modulation, sequentially integrates the DSV of the modulating data D7 (D10B) (FIG. 4L). Further, the DSV integrating circuit 47 generates the sign bit FBB (FIG. 4M) such that the logical level switches in accordance with the sign of the DSV, and outputs the sign bit FBB to the polarity judgment circuit 54. Thereby, in the modulating data generator 30, the DSV at the present moment is detected in addition to the detection of the DSV precedent for one frame and the sign detection of the modulating data D10A.

Figure 5A:
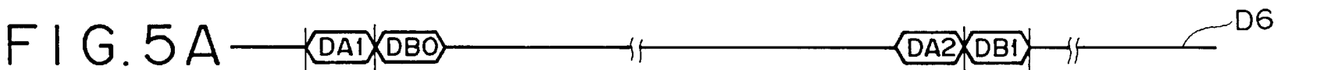
FIGS. 5A to 5L are a waveform chart for explaining the operation of the polarity judgment circuit of the modulating data generator 30 in FIG. 1.
Figure 5B:
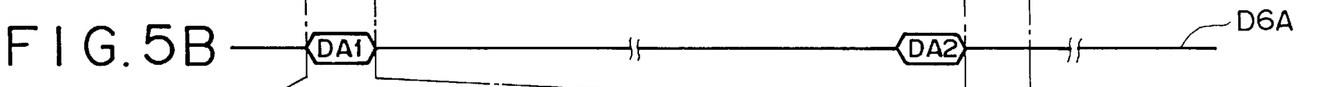
Figure 5C:
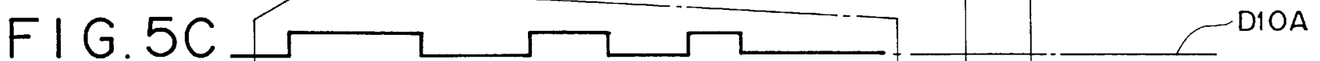
Figures 5D, 5E:
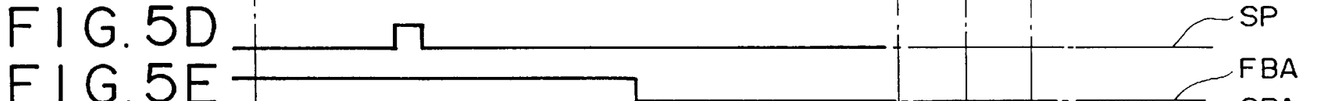
Figures 5F, 5G:
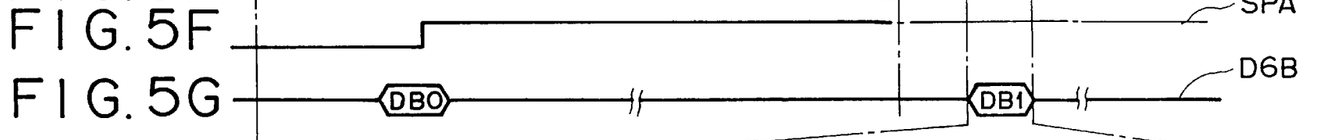
Figure 5H:
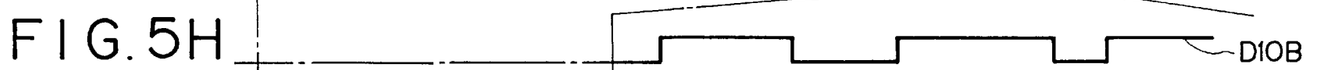
Figure 5I:
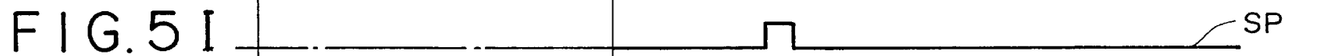

As shown in FIG. 5, when the sampling pulse SP rises (FIG. 5D), the polarity judgment circuit 54 takes in and holds a detection result FBA (FIG. 5E) of the DSV detected from the modulating data D10A (FIG. 5C) and a sign detection result SPA (FIG. 5F). Thereby the polarity judgment circuit 54 detects and holds the dc level and polarity of the modulating data D10B (FIG. 5H) in advance from the modulated data D6A (FIGS. 5A and 5B) precedent for one frame.

Figure 5J:
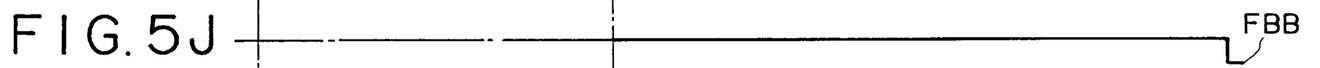
Figures 5K, 5L:
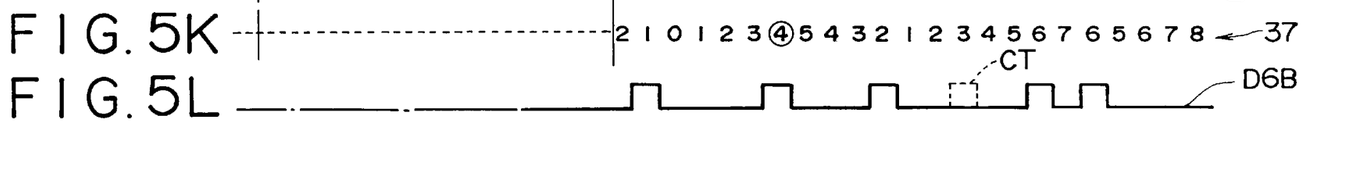
Figure 6:
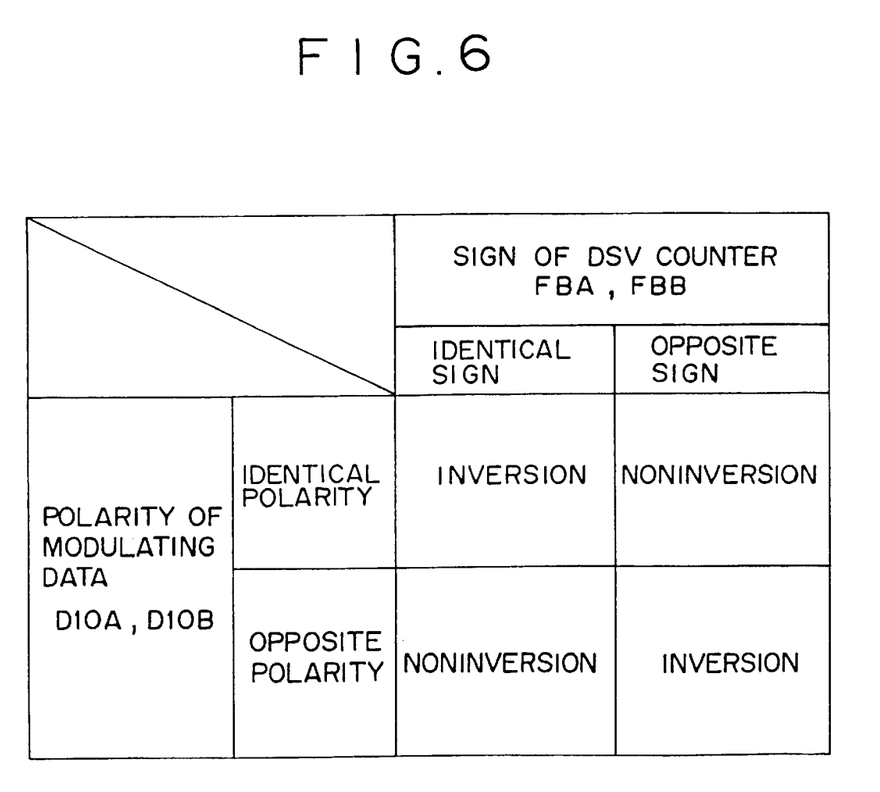
FIG. 6 is a chart for explaining the operation of the polarity judgment circuit of the modulating data generator 30 in FIG. 1.

Further, when the sampling pulse SP (FIG. 4I) rises, the polarity judgment circuit 54 detects the polarity of the modulating data D10B (FIG. 5H) generated from the modulated data D6B (FIG. 5G) and a cumulatively added DSV at the present moment as a detection result FBB (FIG. 5J). Further, the polarity judgment circuit 54 judges to invert the polarity of the control bit CT or not according to the relation shown in FIG. 6, from the detection result FBA of the DSV detected in advance, the detection result FBB of the DSV at the present moment, and the sign detection results of the modulating data D10A and D10B.

In a state shown in FIG. 5, at a timing that the sampling pulse SP rises, both the detection result FBA of the DSV precedent for one frame and the detection result FBB of the DSV at the present moment are held to the logical level "H", and the modulating data D10A and D10B both are held to the logical level "H"; and thereby, the polarity judgment circuit 54 sets the operation of the control bit inverter 56 so as to invert the control bit CT.

Thereby, the modulated data D6B (FIG. 5L) is modulated, while the polarity of the control bit CT is set so as to converge the DSV (FIG. 5K) at the present moment to the zero level, into the modulating data D10B by the NRZI code. And, the modulating data D10B (D7) generates the modulation magnetic field, and thereby the modulated data D6B is recorded into the magneto-optic disc 21.

In the construction described above, the user data D5 (FIG. 2) inputted from a computer or the like is inputted to the EDC encoder 25 in a specific block through the buffer memory 24, where the error detection code is added. Further, the user data D5 is scrambled in the scrambling circuit 26, and thereafter the ID encoder 27 adds a fixed data such as IDs to the user data D5, which is stored in the memory 28. To the data stored in the memory 28, the ECC 29 adds the error correction codes, thereby generating the modulated data D6.

To the modulated data D6 in the modulating data generator 30 in FIG. 1, the preceding modulated data DA0 for one frame and the following modulated data DA1 for one frame are outputted from the memory 28 in the time division. In the following selector 43, the modulated data D6 is separated into the preceding modulated data D6A for one frame and the following modulated data D6B for one frame. Thereby, without employing the delay means, the dc level of the modulating data is detected in advance by the modulated data D6A precedent for one frame, and the dc level of the modulating data is compensated.

Namely, the preceding modulated data D6A is modulated in accordance with the 1–7 modulation system by the modulator 50, and thereafter is converted into the modulating data D10A by the following NRZI modulator 52. Thus, as to the modulating data D10A generated precedently for one frame compared to the modulated data D6B, the one frame DSV counter 46 detects the DSV for one frame from a control bit (FIG. 4) to the next control bit and the sign (FBA) of the DSV to be outputted to the polarity judgment circuit 54.

Further, the NRZI sampler 45 detects the sign of the modulating data D10A by the sampling pulse SP that rises precedently for specific bits compared to the control bit CT. The detected result (SPA) is outputted to the polarity judgment circuit 54. Thereby, in the modulating data generator 30, as to the modulated data D6, the DSV for one frame and the polarity of the modulating data D10A are detected precedently for one frame.

In contrast to that, the modulated data D6B is modulated in accordance with the 1–7 modulation system by the modulator 51, thereafter is inputted to the NRZI modulator 57 through the control bit inverter 56, and is converted therein into the modulating data D10B to be outputted to the driver 31.

Here, the accumulated DSV of the modulating data D10B is counted by the DSV integrating counter 47, and the DSV at the present moment is detected in correspondence with the DSV precedent for one frame detected by the one frame DSV counter 46. In the polarity judgment circuit 54, the polarity at the present moment is detected by the sampling pulse SP.

Thus, the control bit inverter 56 inverts the control bit CT so as to converge the DSV to zero, namely, to make the dc level into zero from the polarity and DSV detected at the present moment and the polarity and DSV detected precedently for one frame. Thereby, the dc level of the modulating data D10B is compensated on the basis of the dc level detected in advance, which is outputted to the driver 31 (FIG. 2). Further, the modulation coil 23 is driven by the modulating data D7 (D10B) and the quantity of the laser beams is raised intermittently; and thereby, the dc level is suppressed and the user data D5 is recorded into the magneto-optic disc 21 by the thermomagnetic recording system.

Thus, to the magneto-optic disc 21 into which the user data D5 is recorded, the laser beams are irradiated from the optical pickup 22, and a change of the plane of polarization of the returned light is detected to generate the regenerative signal RF. The regenerative signal RF is converted into a binary signal in the demodulator circuit 33 and a regenerative clock is generated from the binary signal. Further, the binary signal is sequentially latched on the basis of the regenerative clock to generate a reproduced data. Here, since the dc level of the modulating data D7 is suppressed, the regenerative signal RF is correctly converted into the binary signal, and the jitters, etc. of the regenerative clock are effectively suppressed, and further the bit errors are effectively reduced, thus correctly demodulating the reproduced data.

Thereby, the processing reverse to the recording process is sequentially applied to the reproduced data, and the user data D5 is decoded.

According to the construction as described above, the modulated data D6A precedent for one frame and the original modulated data D6B are outputted from the memory 28 in the time division, and thereafter separated and processed. Thereby, without providing delay circuits, etc., it is possible to detect the DSV of the modulating data in advance and to suppress the dc level of the modulating data from the detection result. Therefore, the total construction of the system can be simplified to that extent, and the modulating data generator 30 can be used commonly to different systems.

The foregoing embodiment deals with a case in which the DSV is detected precedently for one frame in advance. However, the invention is not limited to this and can widely be applied to a case in which the DSV is detected precedently for two frames or more, or further to a case in which the DSV is detected precedently for a period shorter than one frame.

Further, the foregoing embodiment deals with a case in which the dc level is compensated by inverting the control bit for one bit. However, the invention is not limited to this and can widely be applied to a case in which the operation of the NRZI modulator 57 may be switched at a timing corresponding to the control bit to compensate the dc level, or for example, to a case in which the polarity of the entire synchronizing signal is inverted to compensate the dc level.

Further, the foregoing embodiment discusses a case in which the modulated data is recorded in accordance with the 1–7 modulation system. However, the invention is not limited to this and can widely be applied to a case in which the modulated data is modulated in accordance with various PLL modulations.

Still more, the foregoing embodiment deals with a case in which the user data is recorded into a magneto-optic disc. However, the invention is not limited to this and can widely be applied to a case in which desired data is recorded into a phase change type optical disc, or further to a case in which various data are transmitted through transmission lines such as optical discs.

According to the invention as described above, the modulated data to be used for recording is supplied in the time division and the dc level is calculated in advance; and on the basis of the calculation result, the dc level is compensated to generate the modulating data. Thereby, the dc level can be detected in advance with delay circuits omitted. Accordingly, the total construction of the system can be simplified to that extent, and the circuit blocks relating to the transmission system can be employed commonly to different systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for processing data, the processed data recordable onto a recording medium, comprising:

means for storing modulated data and outputting in a time division sequence main modulated data used for transmission and subordinate modulated data for a specific reference period precedent to a period of the main modulated data;

main modulation means for modulating the main modulated data to generate main modulating data;

main dc level detection means for detecting a dc level of the main modulating data and outputting a main dc level;

subordinate modulation means for modulating the subordinate modulated data and to generate subordinate modulating data, by the same processing as with the main modulation means;

subordinate dc level detection means for detecting a dc level of the subordinate modulating data and outputting a subordinate dc level; and dc level compensation means for switching an operation of the main modulation means and compensating the dc level of the main modulating data, on the basis of the dc levels of the main modulating data and the subordinate modulating data.

2. The apparatus for processing data as claimed in claim 1, wherein:

the main modulation means modulates the modulated data to generate modulating data, and thereafter converts the modulating data into main modulating data utilizing an NRZI code; and the dc level compensation means inverts a specific bit set of the modulating data and compensates the dc level of the main modulating data.

3. A method for processing data, in which stored modulated data is modulated to generate modulating data, the modulating data recordable onto a recording medium, the method comprising the steps of:

reading out in a time division sequence main modulated data used for transmission and subordinate modulated data for a specific reference period precedent to the main modulated data;

detecting in advance, from modulating data generated from the subordinate modulated data, a dc level of said modulating data; and compensating, from said dc level, a dc level of modulating data generated from the following main modulated data.

4. An apparatus for processing data, the processed data recordable onto a recording medium, comprising:

a memory for storing modulated data, and outputting in a time division sequence main modulated data used for transmission and subordinate modulated data for a specific reference period precedent to a period of the main modulated data;

a modulator for modulating the main modulated data to generate main modulating data;

a main dc level detector for detecting a dc level of the main modulating data and outputting a main dc level;

a subordinate modulator for modulating the subordinate modulated data and to generate subordinate modulating data, by the same processing as with the modulator;

a subordinate dc level detector for detecting a dc level of the subordinate modulating data and outputting a subordinate dc level; and a dc level compensator for switching an operation of the main modulator and compensating the dc level of the main modulating data, on the basis of the dc levels of the main modulating data and the subordinate modulating data.

5. The apparatus for processing data as claimed in claim 4, wherein:

the main modulator modulates the modulated data to generate modulating data, and thereafter converts the modulating data into main modulating data utilizing an NRZI code; and the dc level compensator inverts a specific bit set of the modulating data and compensates the dc level of the main modulating data.

6. A method for processing data, the processed data recordable onto a recording medium, comprising the steps of:

storing modulated data in a memory element and outputting in a time division sequence main modulated data used for transmission and subordinate modulated data for a specific reference period precedent to a period of the main modulated data;

modulating the main modulated data to generate main modulating data;

detecting a dc level of the main modulating data and outputting a main dc level;

modulating the subordinate modulated data and to generate subordinate modulating data, by the same processing as with the main modulating data;

detecting a dc level of the subordinate modulating data and outputting a subordinate dc level; and compensating the dc level of the main modulating data, on the basis of the dc levels of the main modulating data and the subordinate modulating data.

7. The method as claimed in claim 6, further comprising the steps of:

modulating the modulated data to generate modulating data, and thereafter converting modulating data is modulated into main modulating data utilizing an NRZI code; and inverting a specific bit set of the modulating data and compensating the dc level of the main modulating data.

8. An apparatus for processing data, comprising:

storage means for storing modulated data, and outputting in a time division sequence main modulated data used for transmission and subordinate modulated data for a specific reference period precedent to a period of the main modulated data;

main modulation means for modulating the main modulated data to generate main modulating data;

main dc level detection means for detecting a dc level of the main modulating data and outputting a main dc level;

subordinate modulation means for modulating the subordinate modulated data and to generate subordinate modulating data, by the same processing as with the main modulation means;

subordinate dc level detection means for detecting a dc level of the subordinate modulating data and outputting a subordinate dc level; and dc level compensation means for switching an operation of the main modulation means and compensating the dc level of the main modulating data, on the basis of the dc levels of the main modulating data and the subordinate modulating data.

9. The apparatus for processing data as claimed in claim 8, wherein:

the main modulation means modulates the modulated data to generate modulating data, and thereafter converts the modulating data into main modulating data utilizing an NRZI code; and the dc level compensation means inverts a specific bit set of the modulating data and compensates the dc level of the main modulating data.

10. A method for processing data, in which modulated data stored in a memory element is modulated to generate modulating data, the method comprising the steps of:

reading out in a time division sequence main modulated data used for transmission and subordinate modulated data for a specific reference period precedent to the main modulated data;

detecting in advance, from modulating data generated from the subordinate modulated data, a dc level of said modulating data; and compensating, from said dc level, a dc level of modulating data generated from the following main modulated data.

11. An apparatus for processing data, comprising:

a memory for storing modulated data, and outputting in a time division sequence main modulated data used for transmission and subordinate modulated data for a specific reference period precedent to a period of the main modulated data;

a modulator for modulating the main modulated data to generate main modulating data;

a main dc level detector for detecting a dc level of the main modulating data and outputting a main dc level;

a subordinate modulator for modulating the subordinate modulated data and to generate subordinate modulating data, by the same processing as with the modulator;

a subordinate dc level detector for detecting a dc level of the subordinate modulating data and outputting a subordinate dc level; and a dc level compensator for switching an operation of the main modulator and compensating the dc level of the main modulating data, on the basis of the dc levels of the main modulating data and the subordinate modulating data.

12. The apparatus for processing data as claimed in claim 11, wherein:

the main modulator modulates the modulated data to generate modulating data, and thereafter converts the modulating data into main modulating data utilizing an NRZI code; and the dc level compensator inverts a specific bit set of the modulating data and compensates the dc level of the main modulating data.

13. A method for processing data, comprising the steps of:

storing modulated data, and outputting in a time division sequence main modulated data used for transmission and subordinate modulated data for a specific reference period precedent to a period of the main modulated data;

modulating the main modulated data to generate main modulating data;

detecting a dc level of the main modulating data and outputting a main dc level;

modulating the subordinate modulated data and to generate subordinate modulating data, by the same processing as with the main modulated data;

detecting a dc level of the subordinate modulating data and outputting a subordinate dc level; and compensating the dc level of the main modulating data, on the basis of the dc levels of the main modulating data and the subordinate modulating data.

14. The method as claimed in claim 13, further comprising the steps of:

modulating the modulated data to generate modulating data, and thereafter converting modulating data is modulated into main modulating data utilizing an NRZI code; and inverting a specific bit set of the modulating data and compensating the dc level of the main modulating data.

15. An apparatus for processing data, the processed data transmissible through a transmission medium, comprising:

storage means for storing modulated data, and outputting in a time division sequence main modulated data used for transmission and subordinate modulated data for a specific reference period precedent to a period of the main modulated data;

main modulation means for modulating the main modulated data to generate main modulating data;

main dc level detection means for detecting a dc level of the main modulating data and outputting a main dc level;

subordinate modulation means for modulating the subordinate modulated data and to generate subordinate modulating data, by the same processing as with the main modulation means;

subordinate dc level detection means for detecting a dc level of the subordinate modulating data and outputting a subordinate dc level; and dc level compensation means for switching an operation of the main modulation means and compensating the dc level of the main modulating data, on the basis of the dc levels of the main modulating data and the subordinate modulating data.

16. The apparatus for processing data as claimed in claim 15, wherein:

the main modulation means modulates the modulated data to generate modulating data, and thereafter converts the modulating data into main modulating data utilizing an NRZI code; and the dc level compensation means inverts a specific bit set of the modulating data and compensates the dc level of the main modulating data.

17. A method for processing data, in which modulated data stored in a memory element is modulated to generate modulating data, the processed data transmissible through a transmission medium, the method comprising the steps of:

reading out in a time division sequence main modulated data used for transmission and subordinate modulated data for a specific reference period precedent to the main modulated data;

detecting in advance, from modulating data generated from the subordinate modulated data, a dc level of said modulating data; and compensating, from said dc level of modulating data generated from the following main modulating data.

18. An apparatus for transmitting data, comprising:

a memory for storing modulated data, and outputting in a time division sequence main modulated data used for transmission and subordinate modulated data for a specific reference period precedent to a period of the main modulated data;

a modulator for modulating the main modulated data to generate main modulating data;

a main dc level detector for detecting a dc level of the main modulating data and outputting a main dc level;

a subordinate modulator for modulating the subordinate modulated data and to generate subordinate modulating data, by the same processing as with the modulator;

a subordinate dc level detector for detecting a dc level of the subordinate modulating data and outputting a subordinate dc level; and a dc level compensator for switching an operation of the main modulator and compensating the dc level of the main modulating data, on the basis of the dc levels of the main modulating data and the subordinate modulating data.

19. The apparatus for transmitting data as claimed in claim 18, wherein:

the main modulator modulates the modulated data to generate modulating data, and thereafter converts the modulating data into main modulating data utilizing an NRZI code; and the dc level compensator inverts a specific: bit set of the modulating data and compensates the dc level of the main modulating data.

20. A method for transmitting data, comprising the steps of:

storing modulated data, and outputting in a time division sequence main modulated data used for transmission and subordinate modulated data for a specific reference period precedent to a period of the main modulated data;

modulating the main modulated data to generate main modulating data;

detecting a dc level of the main modulating data and outputting a main dc level;

modulating the subordinate modulated data and to generate subordinate modulating data, by the same processing as with the main modulated data;

detecting a dc level of the subordinate modulating data and outputting a subordinate dc level; and compensating the dc level of the main modulating data, on the basis of the dc levels of the main modulating data and the subordinate modulating data.

21. The method as claimed in claim 20, further comprising the steps of:

modulating the modulated data to generate modulating data, and thereafter converting modulating data is modulated into main modulating data utilizing an NRZI code; and inverting a specific bit set of the modulating data and compensating the dc level of the main modulating data.

* * * * *